United States Patent
Nitsche

(10) Patent No.: US 7,157,728 B2
(45) Date of Patent: Jan. 2, 2007

(54) EQUIPMENT AND SYSTEM FOR READING OUT X-RAY INFORMATION STORED IN A STIMULATABLE PHOSPHOR LAYER

(75) Inventor: Werner Nitsche, Unterhaching (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 100 days.

(21) Appl. No.: 11/079,306

(22) Filed: Mar. 14, 2005

(65) Prior Publication Data

US 2005/0218354 A1    Oct. 6, 2005

(30) Foreign Application Priority Data

Apr. 6, 2004    (EP)    ................. 04101426

(51) Int. Cl.
*G01N 23/04* (2006.01)

(52) U.S. Cl. ...................... 250/584; 250/587

(58) Field of Classification Search ............... 250/584
See application file for complete search history.

(56) References Cited

U.S. PATENT DOCUMENTS

| 5,072,119 A | 12/1991 | Yamaguchi |
| 6,759,673 B1 * | 7/2004 | Akimoto et al. ............ 250/587 |
| 2002/0003218 A1 | 1/2002 | Yasuda |
| 2002/0185620 A1 | 12/2002 | Akimoto et al. |
| 2005/0092943 A1 | 5/2005 | Nitsche et al. |

OTHER PUBLICATIONS

Search Report from European Application No. 04101426.7, filed Apr. 6, 2004.

* cited by examiner

*Primary Examiner*—David Porta
*Assistant Examiner*—Marcus Taningco
(74) *Attorney, Agent, or Firm*—Houston Eliseeva LLP

(57) ABSTRACT

Apparatus for reading out X-ray information stored in a stimulatable phosphor layer, includes: a plurality of light sources used to emit stimulation light which can stimulate the phosphor layer to emit emission light; a detector used to collect emission light emitted from the phosphor layer; and a control unit for controlling an intensity of the light sources by using a control parameter determined from a reference light source in a regulation unit. The highest possible level of homogeneity and constancy of the light sources will be achieved.

13 Claims, 2 Drawing Sheets

EQUIPMENT AND SYSTEM FOR READING OUT X-RAY INFORMATION STORED IN A STIMULATABLE PHOSPHOR LAYER

The invention relates to equipment and a corresponding system for reading out X-ray information stored in a stimulatable phosphor layer.

X-ray information can be stored in so-called storage phosphors, whereby X-ray radiation passing through an object, for example, a patient, is stored as a latent picture in a phosphor layer. In order to read out the latent picture, the phosphor layer is irradiated with stimulation light, and so stimulated into emitting emission light. The emission light, the intensity of which corresponds to the picture stored in the phosphor layer, is recorded by an optical detector and converted into electric signals. The electric signals are further processed, as required, and finally made available for examination, in particular for medical diagnostic purposes, whereby they are displayed by corresponding display equipment, eg. a monitor or a printer.

Amongst others, line light sources which irradiate the phosphor layer in a line-shaped area with stimulation light, can be used as a stimulation light source in such equipment. This type of light source often includes a number of individual light sources arranged in a row, the individual cones of light of the same being superposed on the line-shaped area of the phosphor layer.

During operation of such equipment, there can be periodic fluctuations in the intensity of the stimulation light emitted from the individual light sources. The intensity of the stimulation light in the line-shaped area of the phosphor layer which needs to be constant over time and spatially homogeneous so as to give a high quality of the X-ray information read out from the phosphor layer is then no longer guaranteed.

It is the aim of the invention to provide equipment of the type mentioned at the outset, which guarantees the highest possible level of constancy over time and spatial homogeneity of the stimulation light coming into contact with the phosphor layer and at the same time, with a simple structure.

SUMMARY OF THE INVENTION

Apparatus for reading out X-ray information stored in a stimulatable phosphor layer, includes: a plurality of light sources used to emit stimulation light which can stimulate the phosphor layer to emit emission light; a detector used to collect emission light emitted from the phosphor layer; and a control unit for controlling an intensity of the light sources by using a control parameter determined from a reference light source in a regulation unit. The highest possible level of homogeneity and constancy of the light sources will be achieved.

BRIEF DESCRIPTION OF THE DRAWINGS

The invention is described in greater detail with reference to the figures as noted below.

DETAILED DESCRIPTION OF THE PREFERRED EMBODIMENTS

Figure 1:
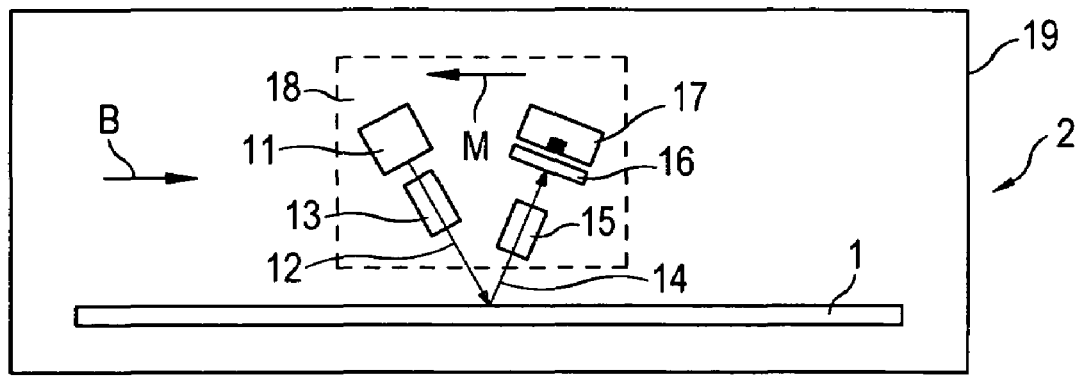
FIG. 1 shows a side view of the apparatus in accordance with the invention.

The invention is based on the idea of controlling the intensity of the light sources during operation of the equipment, whereby the control of the intensity of each individual light source is carried out dependent upon a control parameter. The control is preferably carried out continuously, ie. during the whole operation from the switching on to the switching off of the light sources. The control parameter for this—which is preferably the same for all light sources of the stimulation light source—is determined by means of a reference light source which has operational characteristics which are similar to those of the respective light sources or identical to the same. In this way a high level of constancy over time and spatial homogeneity of the stimulation light in the illuminated area of the phosphor layer is achieved as well as a simple structure.

In a preferred embodiment of the invention, it is proposed that the regulation unit includes the reference light source and a sensor for collecting the light emitted from the reference light source and producing a reference signal which corresponds to the intensity of the recorded light, from which the control parameter can be deduced. In this way, the characteristics of the reference light source over time can be established in a simple manner, from which the control parameter used for the control of the light sources can be deduced.

Here, it is preferred that the regulation unit is designed to deduce the control parameter from a deviation of the reference signal from a reference desired value. For this, the regulation unit preferably has a regulation circuit which can compensate the deviation of the reference signal from the reference desired value by changing a reference light source voltage applied to the reference light source. By means of the regulation circuit, the intensity of the reference light source is automatically held at a pre-specifiable desired value, whereby the reference light source voltage is correspondingly regulated, ie. increased or decreased. With the same or similar characteristics over time of the reference light source and the individual light sources, the control parameter used for control of the intensity of the individual light sources can then be simply deduced from the reference light source voltage.

In another preferred embodiment, it is proposed that the regulation unit has a subtracting device used to establish a difference between the reference light source voltage and the reference desired value, and that the control parameter corresponds to this established difference. With this embodiment, the control parameter takes on a value different from zero if the reference light source voltage, with which the reference light source is actually operated, deviates from the voltage corresponding to the reference value, with which the reference light source should be operated in order to achieve a desired intensity. Preferably a reference input voltage, which applies at an input point of the regulation circuit, corresponds to the reference desired value.

In another preferred embodiment it is proposed that the control unit for each of the light sources respectively includes a control device which can set a light source voltage for the respective light source, dependent upon the control parameter. In this way it is possible for the light source voltage for each respective light source to be set individually for each light source. The intensity of the individual light sources is therefore controllable for each respective individual one.

It is preferred here that the control device has an adding device to establish the sum from the control parameter and a light source input voltage for the respective light source, whereby the light source voltage for the respective light source corresponds to this sum. In this way, the light source voltage for each individual light source is set in a simple manner dependent upon the control parameter.

Preferably, the reference light source and the individual light sources respectively are of the same constructional type. In this way it can be guaranteed that the reference light source, by means of which the control parameter is determined, has characteristics over time which are essentially identical to those of the individual light sources. In this way, any changes to the intensity of the light sources during operation are compensated with a particularly high level of reliability, and so can be avoided.

Moreover, it is advantageous to couple the reference light source thermally with the light sources. Because intensity fluctuations of the individual light sources are largely brought about by thermal influences, intensity fluctuations of the individual light sources are prevented in this way with a particularly high level of reliability.

In another embodiment of the invention, a storage unit is provided in which the control parameter can be stored, and which the control unit can access. With this embodiment, the regulation unit can form a separate unit and, independently of the equipment in accordance with the invention, determine the control parameter which can be stored in the storage unit. The control unit can then access the storage unit during operation of the equipment in accordance with the invention, and establish the required control parameter. In this way, the installation of a corresponding regulation unit in the equipment in accordance with the invention can be dispensed with.

With the last specified embodiment in particular, it can also be proposed for the regulation unit to be designed so as to determine the control parameter dependent upon the time after switching on the reference light source and/or upon the ambient temperature surrounding the reference light source. With this embodiment, the control parameter which is dependent upon the time and/or the ambient temperature can be determined in the separate regulation unit and be deposited in the storage unit. During operation of the equipment, the control unit can access the storage unit, which is preferably integrated into the equipment, and in this way, the control parameter, which corresponds to the respective time after switching on the light sources and/or the ambient temperature surrounding the light sources during operation of the light sources, is established. For this, corresponding measuring devices used to measure the time and/or the ambient temperature are provided in the equipment.

As well as the equipment and the embodiments of the same described above, the system in accordance with the invention also includes the corresponding regulation unit used to determine the control parameter by means of light which is emitted by the reference light source.

The system including the control unit and the regulation unit can therefore be fully integrated into a read-out unit for selecting from phosphor layers. The control parameter here is preferably determined in real time, ie. during operation of the individual light sources.

In an alternative embodiment of the system, the control unit can be integrated into the read-out unit, whereas the regulation unit is located outside of the read-out unit. With this embodiment, the control parameter in particular is determined separately from the operation of the individual light sources, and then deposited in a storage unit. The control parameter is preferably determined dependent upon the time after switching-on the reference light source and/or upon the ambient temperature surrounding the reference light source, in the manner already described above.

FIG. 1 shows a side view of the equipment in accordance with the invention for reading out X-ray information stored in a phosphor layer 1. The equipment has a line light source 11 used to produce stimulation light 12, which is focussed onto the phosphor layer 1 by means of a first optical device 13, whereby a line-shaped area of the phosphor layer running at right angles to the plane of the figure is irradiated with stimulation light 12. In this area, the phosphor layer 1 is stimulated to emit emission light 14, which is collected by a detector 17 which is in the form of a line-shaped detector which also runs at right angles to the plane of the figure. In order to focus the emission light 14 onto the detector 17, a corresponding second optical device 15 is provided. A filter device 16 is essentially penetrable for emission light 14 and essentially impenetrable for stimulation light 12. In this way it is guaranteed that the emission light 14 to be collected by the detector 17 is not falsified by sections of the stimulation light 12 reflected or dispersed on the phosphor layer 1.

The specified components together form a read-out head 18 which is moved over the phosphor layer in conveyance direction M so as to read out the X-ray information stored in the phosphor layer 1, whereby the X-ray information stored in the phosphor layer 1 is successively read out.

The equipment in accordance with the invention is integrated into a housing 19 of a corresponding read-out unit 2 used to read out from phosphor layers. The read-out unit 2 here can be designed in such a way that the respective phosphor layer 1 to be read out is introduced into the read-out unit 2 before selection, and after selection it is removed from the read-out unit 2 once again. The housing 19 of this type of read-out unit 2 has for this purpose a corresponding opening (not shown) through which a cassette with the phosphor layer 1 inside can be introduced. Alternatively, the read-out unit 2 can be in the form of a so-called cassette-free system, whereby the phosphor layer 1 is integrated so as to be fixed inside the housing 19. This type of system can be used like a conventional X-ray cassette for the recording of X-ray pictures, however has the advantage over the latter that it does not have to be introduced into a special read-out unit, rather it already has the read-out head 18 required for this as an integral component. The information stored in the phosphor layer 1 when recording X-rays using this type of cassette-free system can then be read out directly without any further handling of the cassette or similar.

Figure 2:
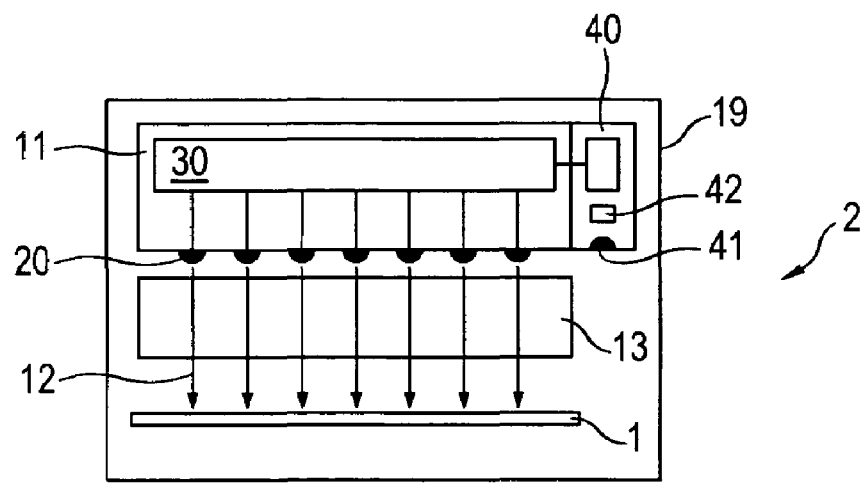
FIG. 2 shows a front view of a first embodiment used as an example of the apparatus in accordance with the invention.

FIG. 2 shows a front view of a first embodiment, used as an example, of equipment in accordance with the invention integrated into a read-out unit 2. The front view illustrated here runs in viewing direction B of the view shown in FIG. 1. As can be seen in this illustration, the line light source 11 has several light sources 20 arranged in a row which respectively emit stimulation light 12 which is focussed onto the phosphor layer 1 by means of the first optical device 13. In the example shown, a total of seven light sources 20 can be seen. In many applications, the number of light sources is mostly significantly higher, and there are preferably between approximately 30 and 50 light sources 20 per line light source 11. The individual light sources 20 are preferably laser diodes (LDs) or very light-intense light-emitting diodes (LEDs).

In order to control the individual light sources 20, a control unit 30 is provided which can individually control the respective intensities of the light sources 20. In accordance with the invention, this control is carried out by using a control parameter which is determined in a regulation unit 40.

The regulation unit 40 here has a reference light source 41 and a sensor 42 which collects the light issued from the reference light source 41 and converts it into a corresponding reference signal. In the regulation unit 40, the control parameter is deduced from the reference signal, and the control parameter can then be used in the control unit 30 for setting the intensities of the individual light sources 20.

Figure 3:
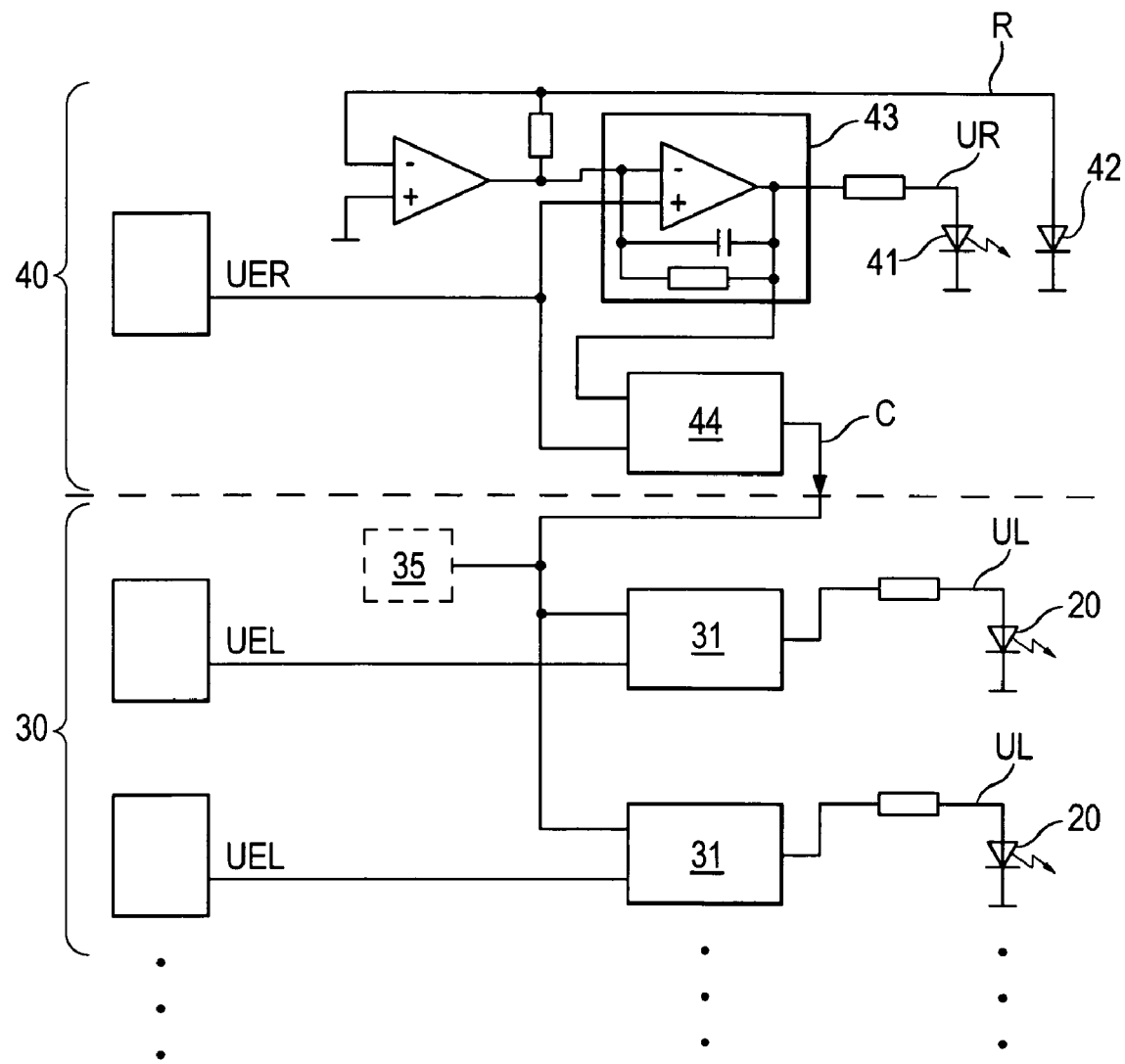
FIG. 3 shows a circuit diagram for the control of the intensity of the individual light sources in accordance with the invention.

FIG. 3 shows a circuit diagram for control, in accordance with the invention, of the intensity of the individual light sources 20. The individual components of the circuit shown are essentially contained within two main components, ie. in the control unit 30, on the one hand, and the regulation unit 40, on the other hand.

The reference light source 41 is operated with a reference light source voltage UR, and emits light which is collected by the sensor 42 and converted into a reference signal R which corresponds to the intensity of the light. The reference signal R is compared with a reference input voltage UER, which corresponds to the reference desired value, by means of a regulator circuit 43. With a deviation of the reference signal R from the reference desired value UER, the reference light source voltage UR and so also the intensity of the light emitted from the reference light source, is altered by means of the regulator circuit 43 in such a way, that this deviation is compensated. If, for example, due to periodic fluctuations in intensity, the momentary intensity of the light emitted from the reference light source 41 is higher than that which corresponds to the reference desired value UER, the reference light source voltage UR is reduced in the regulation circuit 43 to such a degree that the reference signal R corresponding to the intensity is identical to the reference desired value UER.

The reference light source voltage UR contained in this regulation circuit is entered along with the reference desired value UER into a subtracting device 44 which establishes the difference between the two voltages. This difference then serves as control parameter C.

The control parameter C obtained in this way is entered into the control unit 30. This has control devices 31, whereby an individual control device 31 is provided for each of the light sources 20. In the example illustrated here, the control devices 31 are respectively in the form of adding devices in which the control parameter C with a light source input voltage UEL is added to a light source voltage UL which is applied to the respective light source 20.

The individual light source input voltages UEL are generally different so as to take into account small differences in intensity which can even occur with light sources 20 of the same constructional type. These light source input voltages UEL which generally differ from one another are preferably already set correspondingly when the equipment in accordance with the invention is produced. Because this so-called type dispersion of the intensity of individual light sources 20 of the same constructional type mostly, however, does hot significantly change during operation of the light sources 20, changing of the light source input voltages UEL during operation is generally not necessary.

On the other hand, periodic fluctuations in intensity which occur with this circuit, for example as a result of temperature-dependent effects, during operation of the individual light sources 20 are compensated by using the control parameter C and by corresponding adaptation of the respective light source voltage UL. The invention here is based upon the surprising fact that the intensity characteristics of the light sources 20 of the same constructional type over time during operation are essentially identical. By means of this, the control, in accordance with the invention, of the individual light sources 20 with just one control parameter 20 leads to an exceptionally reliable compensation of intensity fluctuations with, at the same time, a simple structure.

With the described control of the intensity of the individual light sources 20 in the control unit 30 by using the control parameter C determined in the regulation unit 40, the so-called Master/Slave Principle is put into practice.

In a variation of the circuit shown in FIG. 3, the control parameter C determined in the regulation unit 40 can be stored in a storage unit 35. A direct connection between the control unit 30 and the regulation unit 40 is then no longer required. On the contrary, with this embodiment, control parameter C can be determined, preferably dependent upon time and the ambient temperature of the reference light source 41, and deposited in the storage unit 35. During operation of the equipment in accordance with the invention, the control unit 30 then locks onto the control parameter C (which is dependent upon time and the ambient temperature) in the storage unit 35, and deduces from this the individual light source voltages UL for the light sources 20.

As well as the components described above, the circuit illustrated also includes other electronic components such as, eg. resistors and a capacitor which can be omitted or be of different proportions for different variations of the circuit in accordance with the invention. This, as well as the provision of further components (not illustrated) falls within the framework of common expert knowledge, and so is not described in greater detail.

Figure 4:
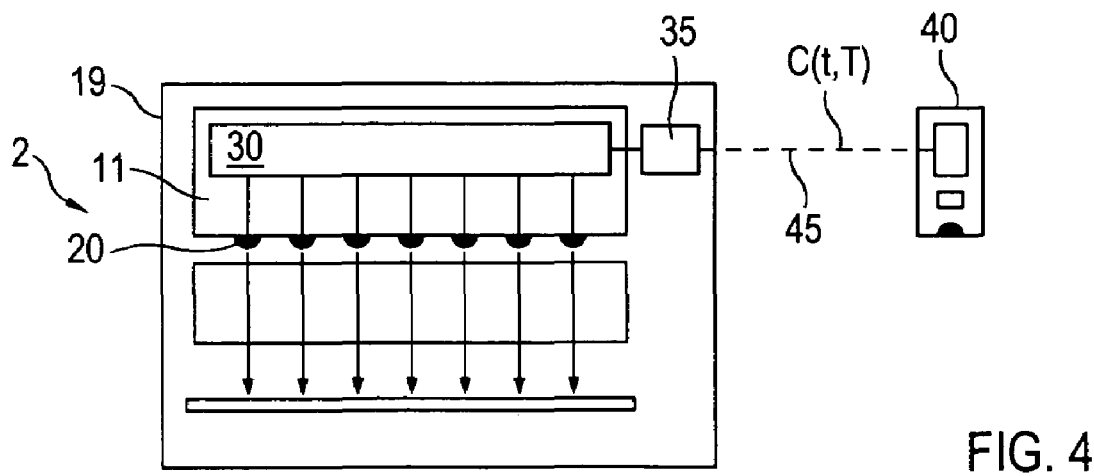
FIG. 4 shows a front view of a second embodiment used as an example of the apparatus in accordance with the invention.

FIG. 4 shows a front view of a second embodiment, given as an example, of the equipment in accordance with the invention. This embodiment differs from that shown in FIG. 2 in that the regulation unit 40 is not a component part of the read-out unit 2, but it is separate from this and can be operated independently.

With this embodiment, the control parameter C is determined in the regulation unit 40 in the same way as with the regulation unit shown in FIG. 2. The embodiments shown by FIGS. 2 and 3 apply correspondingly. Differently to this, in the example shown in FIG. 4, the control parameter C is determined at different points in time t and with different ambient temperatures T, and deposited in a storage unit 35 as a data field C(t, T) dependent upon the time t and the ambient temperature T, for example as a so-called Lookup Table. In the example shown, the storage unit 35 is integrated into the read-out unit 2 and connected with a data line 45 to the regulation unit 40. Alternatively, the storage unit 35 can also be located outside of the housing 19 of the read-out unit 2, for example in a central fileserver, onto which several read-out units can be attached.

After the control parameter is determined for a required and desired time and temperature range and deposited in the storage unit 35, the data line 45 between the regulation unit 40 and the storage unit 35 can be separated.

The ambient temperatures T, at which the control parameter C is determined, typically lie within a range of between approx. 10 and 60 degrees celsius (° C.), in particular between 20 and 40° C. The control parameter C here is preferably determined in temperature steps $\Delta T$ of approx. 1 to 5° C. The period of time during which the control parameter C is determined dependent upon the time t lies typically between approx. 0.5 and 100 milliseconds (ms), in particular in the range of 1 to 5 ms. The control parameter C here is preferably determined in time intervals Δt between 50 and 200 microseconds (μs).

In this example, the control unit 30 has appropriate measuring equipment (not illustrated) for collecting the respective time and/or ambient temperature t or T during operation of the light sources 20 and locks onto the control parameter C(t, T) corresponding to both of these parameters in the storage unit 35. The control parameter C obtained in this way is finally used for the control, in accordance with the invention, of the intensity of the individual light sources 20.

The line light source 11 of the equipment in accordance with the invention and in accordance with FIGS. 1, 2 and 4 is preferably operated by pulse, whereby the individual light sources 20 are alternately, preferably periodically, turned on and off. By means of the periodically fluctuating development of heat associated with this, the ambient temperature also changes, as do, correspondingly, the intensity characteristics of the light sources 20 over time. By means of the thermal coupling, in accordance with the invention, of the reference light source 41 with the light sources 20 in the example shown in FIG. 2 or the determination dependent upon time and temperature and the storage of the control parameter C in accordance with the example shown in FIG. 4, periodic intensity fluctuations of the light sources 20, in particular as a result of temperature fluctuations during operation of the line light source 11, are avoided with a high level of reliability and, at the same time, a simple structure.

The invention claimed is:

1. Apparatus for reading out X-ray information stored in a stimulatable phosphor layer, comprising:
   a plurality of light sources used to emit stimulation light which can stimulate the phosphor layer to emit emission light;
   a detector used to collect emission light emitted from the phosphor layer; and
   a control unit for controlling an intensity of the light sources by using a control parameter determined from a reference light source in a regulation unit.

2. Apparatus in accordance with claim 1, wherein the regulation unit further comprises:
   the reference light source;
   a sensor used to collect light emitted from the reference light source, and to produce a reference signal which corresponds to an intensity of the light collected; and
   a deducing component for deducing the control parameter from the reference signal.

3. Apparatus in accordance with claim 2, wherein the deducing component of the regulation unit deduces the control parameter from a deviation of the reference signal from a reference desired value.

4. Apparatus in accordance with claim 3, wherein the regulation unit further comprises a regulation circuit which can compensate the deviation of the reference signal from the reference desired value by changing a reference light source voltage which is applied to the reference light source.

5. Apparatus in accordance with claim 4, wherein the deducing component of the regulation unit deduces the control parameter from the reference light source voltage.

6. Apparatus in accordance with claim 4, wherein the regulation unit further comprises a subtracting device to establish a difference between the reference light source voltage and the reference desired value, wherein the control parameter corresponds to said difference.

7. Apparatus in accordance with claim 1 wherein the control unit further comprises a control device for each of the light sources, said control devices capable of setting a light source voltage for the respective light source dependent upon the control parameter.

8. Apparatus in accordance with claim 7, wherein the control device further comprises an adding device to establish a sum from the control parameter and the light source voltage of a respective light source, wherein said sum corresponds to the light source voltage applied to the respective light source.

9. Apparatus in accordance with claim 1, wherein the reference light source and the plurality of light sources are of the same constructional type.

10. Apparatus in accordance with claim 1, wherein the reference light source is thermally coupled with the plurality of light sources.

11. Apparatus in accordance with claim 1, further comprising a storage unit accessible by the control unit, in which the control parameter can be stored.

12. Apparatus in accordance with claim 1, wherein the regulation unit determines the control parameter dependent upon time and/or the ambient temperature.

13. Apparatus of claim 1 wherein the regulation unit uses the reference light source to determine the control parameter.

* * * * *